US008169628B2

(12) United States Patent
Ziegler et al.

(10) Patent No.: US 8,169,628 B2
(45) Date of Patent: May 1, 2012

(54) METHOD AND SYSTEM FOR STREAMING IMAGES TO WIRELESS DEVICES

(75) Inventors: Rudy Ziegler, Toronto (CA); Andrew Opala, Mississauga (CA)

(73) Assignee: Bartanva Drio Data, L.L.C., Wilmington, DE (US)

( * ) Notice: Subject to any disclaimer, the term of this patent is extended or adjusted under 35 U.S.C. 154(b) by 524 days.

(21) Appl. No.: 12/366,499

(22) Filed: Feb. 5, 2009

(65) Prior Publication Data

US 2009/0164620 A1 Jun. 25, 2009

Related U.S. Application Data

(62) Division of application No. 10/958,504, filed on Oct. 5, 2004, now Pat. No. 7,667,862.

(51) Int. Cl.
*G06F 3/12* (2006.01)
*G06K 1/00* (2006.01)

(52) U.S. Cl. ..................... 358/1.13; 358/1.15

(58) Field of Classification Search .......... 356/600, 356/666, 667, 668, 670, 671; 358/1.1, 1.9, 358/1.13, 1.15, 1.18, 474, 402; 709/207, 709/208, 209, 223
See application file for complete search history.

(56) References Cited

U.S. PATENT DOCUMENTS

| | | | |
|---|---|---|---|
| 6,141,666 A | 10/2000 | Tobin | 707/513 |
| 6,182,127 B1 | 1/2001 | Cronin, III et al. | 709/219 |
| 6,363,418 B1 | 3/2002 | Conboy et al. | 709/218 |
| 6,449,639 B1 | 9/2002 | Blumberg | 709/217 |
| 6,449,653 B2 | 9/2002 | Klemets et al. | |
| 6,650,326 B1 | 11/2003 | Huber et al. | |
| 6,664,974 B2 | 12/2003 | Lindstrom-Tamer | 345/619 |
| 6,708,309 B1 | 3/2004 | Blumberg | 715/530 |
| 6,874,131 B2 | 3/2005 | Blumberg | 715/205 |
| 7,136,066 B2 | 11/2006 | Li et al. | |
| 7,200,615 B2 | 4/2007 | Eschbach et al. | |
| 7,210,099 B2* | 4/2007 | Rohrabaugh et al. | 715/249 |
| 7,400,334 B1 | 7/2008 | Franklin et al. | 345/619 |
| 7,538,773 B1 | 5/2009 | Hutchins | |
| 7,899,915 B2* | 3/2011 | Reisman | 709/228 |
| 2002/0194302 A1 | 12/2002 | Blumberg | |
| 2003/0034936 A1 | 2/2003 | Ernst et al. | |
| 2003/0135649 A1 | 7/2003 | Buckley et al. | |
| 2006/0026513 A1 | 2/2006 | Eschbach et al. | |
| 2006/0055693 A1 | 3/2006 | Sylthe et al. | |
| 2007/0198918 A1 | 8/2007 | Mor | |

FOREIGN PATENT DOCUMENTS

CA 2504569 10/2005
(Continued)

OTHER PUBLICATIONS

International Preliminary Report on Patentability for PCT/CA2005/001486, issued Apr. 11, 2007.

(Continued)

*Primary Examiner* — Gabriel Garcia

(57) ABSTRACT

A method for streaming media. The method can include requesting, at a client, a first portion of raster data from a server. The raster data can be referenced in a scalable vector graphics (SVG) document. The first portion of raster data and a selection can be received by the client. A second portion of the raster data can be requested from the server based on the first portion and the selection. The client can receive the second portion of raster data.

27 Claims, 10 Drawing Sheets

FOREIGN PATENT DOCUMENTS

| JP | 08-069517 | 3/1996 |
|---|---|---|
| JP | 11-196362 | 7/1999 |
| JP | 2004-110773 | 4/2004 |
| KR | 20000008956 | 2/2000 |

OTHER PUBLICATIONS

International Search Report for PCT/CA2005/001486, mailed Jan. 16, 2006.

W3C Recommendation, Scalable Vector Graphics (SVG) 1.1 Specification, Jan. 14, 2003, pp. 1-16.

Bertolotto et al., "Progressive Transmission of Vector Map Data over the World Wide Web," GeoInformatica 5(4), pp. 345-373, 2001 (37 pages).

Brinkhoff, Thomas, A Portable SVG-Viewer on Mobile Devices for Supporting Geographic Applications, Proceedings of the 6th Agile, Lyon 2003, 10 pages.

Cheung et al., "Visualizing and Editing GIS Data with SVG for Internet and Mobile Users," 2004 Conference on Scalable Vector Graphics, Apr. 20, 2010, 12 pages.

Mong et al., Using SVG as the Rendering Model for Structured and Graphically Complex Web Material, *DocEng 03*, Nov. 20-22, 2003, pp. 88-91.

Neumann et al, "Webmapping with Scalable Vector Graphics (SVG): Delivering the promise of high quality and interactive web maps," Chapter 12 of Maps and the Internet, 2003, pp. 197-220.

Pham, et al., Handheld Devices for Applications Using Dynamic Multimedia Data, ACM 2004, pp. 123-130.

Office Action on Japanese Application 2007-534979, dated Dec. 21, 2010 (with English translation).

Office Action issued on Japanese Application 2007-534979, mailed Jul. 12, 2011 (English translation not available).

* cited by examiner

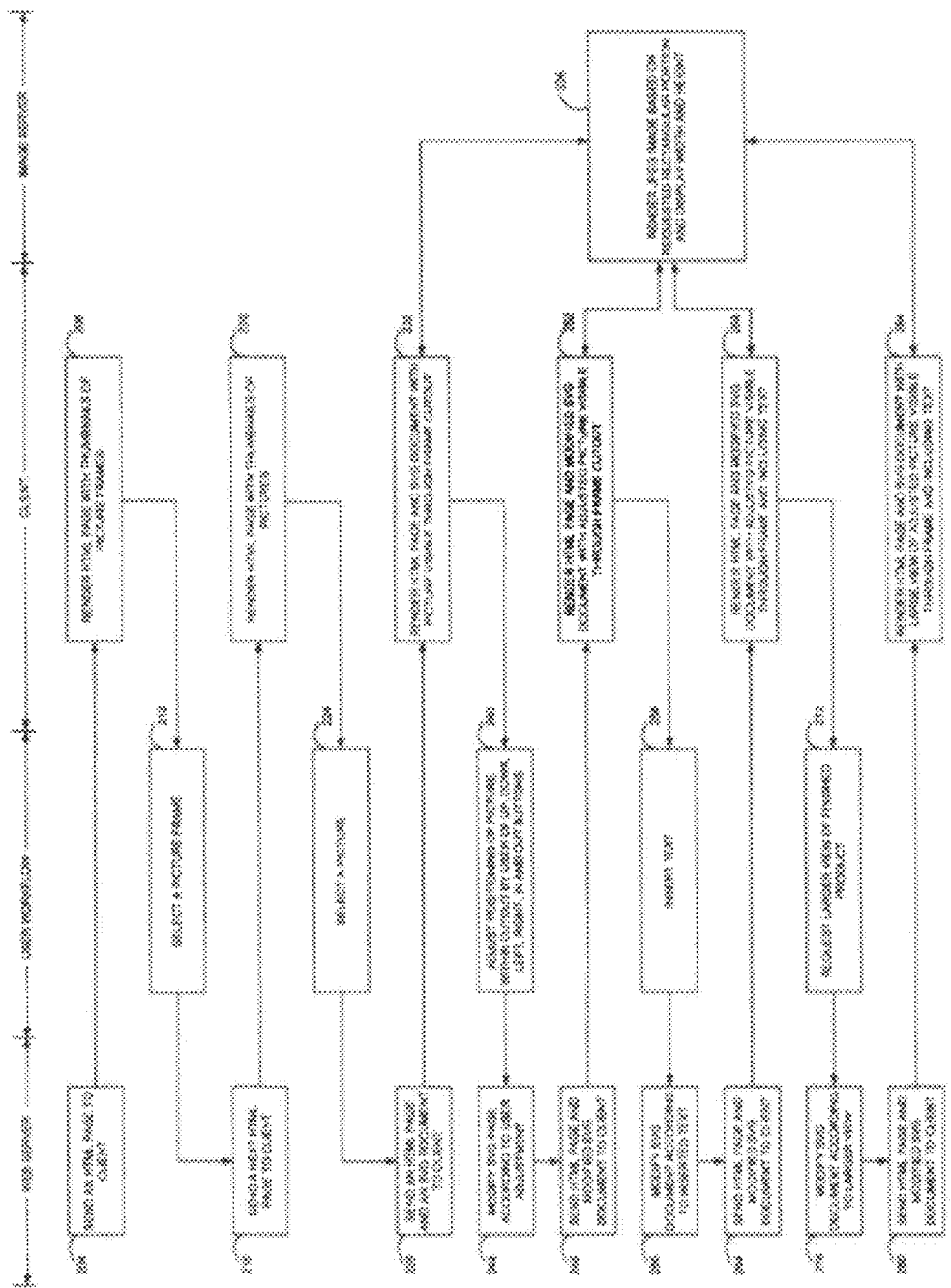

METHOD AND SYSTEM FOR STREAMING IMAGES TO WIRELESS DEVICES

CROSS REFERENCE TO RELATED APPLICATION

This application claims the benefit of 35 U.S.C. §120 as a Divisional Application of U.S. Ser. No. 10/958,504, filed Oct. 5, 2004 now U.S. Pat. No. 7,667,862.

FIELD OF THE INVENTION

The present invention relates to streaming of media, such as images, to wireless devices.

BACKGROUND OF THE INVENTION

Internet streaming is the art of transmitting digital media in such a way that the media can be played at the receiver side as it is being received, without the requirement of saving a media file to disk. Streaming enables live broadcast in the digital world, similar to radio and television broadcasts in the analog world. Conventional streaming is used for time-based media, including digital audio and digital video. A user can listen to music generated from audio data, and can watch movies generated from video data, as the data is being received by his client computer from a server computer, and without the need to save an audio file or a video file on the client computer. As additional data is received at the client, the music and video being played advances in time.

Image streaming is a new paradigm for non-time based media, useful for images and other media that can be interactively viewed and that require large amounts of data for storage. Although an image is a single frame, and not a time-ordered sequence, nevertheless there is great advantage in being able to interactively view the image as image data is being received, without the need to save the image data into a file. A high-quality raster image generally cannot be displayed at its full resolution within a computer display screen. Instead, either a low-resolution version of the image can be displayed in full, or else a high-resolution version can be displayed in part. A user can interactively view different portions of the image by zooming in to a smaller portion of the image at a higher resolution, by zooming out to a larger portion of the image at a lower resolution, or by panning left, right, up and down within a fixed resolution.

Image streaming involves sending image data from a server computer to a client computer in response to a user's interactive viewing requests, in such a way that the client has the necessary data to display the currently requested portion of the image at the currently requested resolution. In distinction to audio and video streaming, which generally push data to the client in a time sequential order, image streaming generally pulls data from the server in an "on demand" order, based on individual user navigation. Thus, while a first user may navigate through the image in his own order, a second user may navigate in a different order. In each case, "just enough data" is streamed to each user in order to satisfy each user's interactive requests.

Image streaming is implemented by generating versions of a raster image at various resolutions, and partitioning the image into rectangular image tiles at each generated resolution. A user request for a specific portion of the image at a specific resolution is satisfied by identifying and transmitting one or more image tiles.

Image streaming can be implemented using various architectures, including server-side rendering, client-side rendering, and mixed server-side and client-side rendering. Server-side rendering requires the server to assemble together the appropriate image tiles, and crop and re-scale the assembled image as appropriate, to generate a single JPEG image, for each interactive user request. An advantage of server-side rendering is that image streaming is enabled for any client computer that has a conventional web browser running; i.e., it does not require special purpose software on the client side. Client-side rendering shifts the image processing burden from the server to the client. The appropriate image tiles are transmitted from the server to the client as raw unprocessed data, and the client does the work to assemble and process the image tiles. An advantage of client-side rendering is faster performance at the client.

A significant distinction between conventional time-based audio and video streaming and between non-time based image streaming, is recurrence of data that is rendered. Specifically, audio and video sequences are generally rendered in a one-pass forward play order, and the same data is generally not rendered more than once. Image navigation, however, is characteristically recurrent. While zooming in and out, and panning left, right, up and down, a user often returns to the same data over and over again. Typically, image tiles are rendered multiple times while a user is navigating through an image. As such, image streaming performance benefits greatly from tile caching.

U.S. Pat. No. 5,968,120 to Guedalia describes image streaming by transmitting image tiles. U.S. Pat. Nos. 6,121,970 and 6,356,283 to Guedalia describe embodiments of server-side image streaming that operate by modifying references to image files within HTML pages, using the Internet Imaging Protocol.

U.S. Pat. No. 6,536,043 to Guedalia and U.S. Pat. No. 6,721,952 to Guedalia et al. describe progressive image streaming, in which successive chunks of image data are transmitted, each successive chunk serving to upgrade the quality of the rendered image.

U.S. Pat. No. 6,745,226 to Guedalia describes a push-pull method and system for transmitting image data, in which data for a low quality version of all image is pushed to a user's desktop, and data for upgrading the quality of the image is pulled on demand by a user.

SUMMARY OF THE DESCRIPTION

The present invention provides a method and system for streaming raster images within SVG documents. The method and system of the present invention can be implemented using a variety of software and hardware architectures, including inter-alia server-side rendering and client-side rendering, and are particularly advantageous for efficiently streaming images to wireless devices.

There is thus provided in accordance with a preferred embodiment of the present invention a method for a method for interactively viewing raster images using scalable vector graphics (SVG), including receiving an SVG document, the SVG document including a reference to a raster image within the SVG document, the reference indicating a rectangular portion, a display width and height, and an IP address for a server computer, passing the SVG document to an SVG viewer, rendering the SVG document, including requesting from the server computer a first portion of raster image data corresponding to the rectangular portion, display width and display height, the first portion of raster image data being derived from the raster image, receiving the first portion of raster image data from the server computer, displaying the first portion of raster image data, transmitting a user request for a different portion of the raster image data, receiving a modified SVG document, modified according to the different portion requested by the user, passing the modified SVG document to the SVG viewer for re-rendering.

There is further provided in accordance with a preferred embodiment of the present invention a method for interactively viewing raster images using scalable vector graphics, including transmitting an SVG document to a client computer, the SVG document including a reference to a raster image, the reference indicating a rectangular portion and a display width and height, receiving an HTTP request from the client computer, modifying the SVG document based on the HTTP request, and transmitting the modified SVG document to the client computer.

There is yet further provided in accordance with a preferred embodiment of the present invention a method for streaming raster images as scalable vector graphics (SVG), including receiving an SVG document, parsing the SVG document, recognizing a reference to a raster image within the SVG document, the reference indicating a file and an IP address for a server computer, requesting a first portion of raster image data from the server computer, the first portion of raster image data being derived from the raster image, receiving the first portion of raster image data from the server computer, displaying the first portion of raster image data, receiving a user request for viewing a different portion of the raster image data, requesting a second portion of raster image data from the server computer, the second portion of raster image data being derived from the raster image, receiving the second portion of raster image data from the server computer, and displaying the second portion of raster image data.

There is moreover provided in accordance with a preferred embodiment of the present invention a method for streaming raster images as scalable vector graphics, including transmitting an SVG document to a client computer, the SVG document including a reference to a raster image, receiving a request for a first portion of raster image data from the client computer, transmitting the first portion of raster image data to the client computer, receiving a request for a second portion of raster image data from the client computer, and transmitting the second portion of raster image data to the client computer.

There is additionally provided in accordance with a preferred embodiment of the present invention a system for interactively viewing raster images using scalable vector graphics (SVG), including a receiver for (i) receiving an SVG document from a server computer, the SVG document including a reference to a raster image within the SVG document, the reference indicating a rectangular portion, a display width and height, and an IP address for a server computer, (ii) receiving a modified SVG document from the server computer, modified according to a different portion, and (iii) receiving a portion of raster image data from the server computer, a transmitter for (i) requesting from the server computer a first portion of raster image data corresponding to the rectangular portion, display width and display height, the first portion of raster image data being derived from the raster image, and (ii) requesting a different portion of the raster image data, and an SVG renderer operatively coupled with the receiver and the transmitter for rendering an SVG document, comprising a raster image processor for displaying a portion of raster image data.

There is further provided in accordance with a preferred embodiment of the present invention a system for interactively viewing raster images using scalable vector graphics, including a transmitter for transmitting an SVG document to a client computer, the SVG document including a reference to a raster image, the reference indicating a rectangular portion and a display width and height, a receiver for receiving an HTTP request from the client computer, and an editor coupled to the transmitter and the receiver for modifying an SVG document based on the HTTP request.

There is yet further provided in accordance with a preferred embodiment of the present invention a system for streaming raster images as scalable vector graphics (SVG), including a receiver for (i) receiving an SVG document, and (ii) receiving a portion of raster image data, a transmitter for (i) requesting a first portion of raster image data from the server computer, the first portion of raster image data being derived from the raster image, an SVG parser coupled to the receiver for (i) parsing an SVG document, and (ii) recognizing a reference to a raster image within the SVG document, the reference indicating a file and an IP address for a server computer, a renderer coupled to the receiver for displaying the first portion of raster image data, and an input processor coupled to the transmitter for receiving a user request for viewing a second portion of raster image data that is different than the first portion.

There is moreover provided in accordance with a preferred embodiment of the present invention a system for streaming raster images as scalable vector graphics, including a receiver for receiving a request for a portion of raster image data from a client computer, and a transmitter for (i) transmitting an SVG document to a client computer, the SVG document including a reference to a raster image, and (ii) transmitting a first portion of raster image data to the client computer.

There is additionally provided in accordance with a preferred embodiment of the present invention a computer-readable storage medium storing program code for causing a computer to perform the steps of a computer-readable storage medium storing program code for causing a computer to perform the steps of receiving an SVG document, the SVG document including a reference to a raster image within the SVG document, the reference indicating a rectangular portion, a display width and height, and an IP address for a server computer, passing the SVG document to an SVG viewer, rendering the SVG document, including requesting from the server computer a first portion of raster image data corresponding to the rectangular portion, display width and display height, the first portion of raster image data being derived from the raster image, receiving the first portion of raster image data from the server computer, displaying the first portion of raster image data, transmitting a user request for a different portion of the raster image data, receiving a modified SVG document, modified according to the different portion requested by the user, passing the modified SVG document to the SVG viewer for re-rendering.

There is further provided in accordance with a preferred embodiment of the present invention a computer-readable storage medium storing program code for causing a computer to perform the steps of transmitting an SVG document to a client computer, the SVG document including a reference to a raster image, the reference indicating a rectangular portion and a display width and height, receiving an HTTP request from the client computer, modifying the SVG document based on the HTTP request, and transmitting the modified SVG document to the client computer.

There is yet further provided in accordance with a preferred embodiment of the present invention a computer-readable storage medium storing program code for causing a computer to perform the steps of receiving an SVG document, parsing the SVG document, recognizing a reference to a raster image within the SVG document, the reference indicating a file and an IP address for a server computer, requesting a first portion of raster image data from the server computer, the first portion of raster image data being derived from the raster image, receiving the first portion of raster image data from the server computer, displaying the first portion of raster image data, receiving a user request for viewing a different portion of the raster image data, requesting a second portion of raster image data from the server computer, the second portion of raster image data being derived from the raster image, receiving the second portion of raster image data from the server computer, and displaying the second portion of raster image data.

There is moreover provided in accordance with a preferred embodiment of the present invention a computer-readable storage medium storing program code for causing a computer to perform the steps of transmitting an SVG document to a client computer, the SVG document including a reference to a raster image, receiving a request for a first portion of raster image data from the client computer, transmitting the first portion of raster image data to the client computer, receiving a request for a second portion of raster image data from the client computer, and transmitting the second portion of raster image data to the client computer.

BRIEF DESCRIPTION OF THE DRAWINGS

The present invention will be more fully understood and appreciated from the following detailed description, taken in conjunction with the drawings in which:

FIG. 2 is a simplified flow chart of a server-side method for implementing the workflow described in FIGS. 1A-1F, in accordance with a preferred embodiment of the present invention;

LIST OF APPENDICES

Figure 1A:
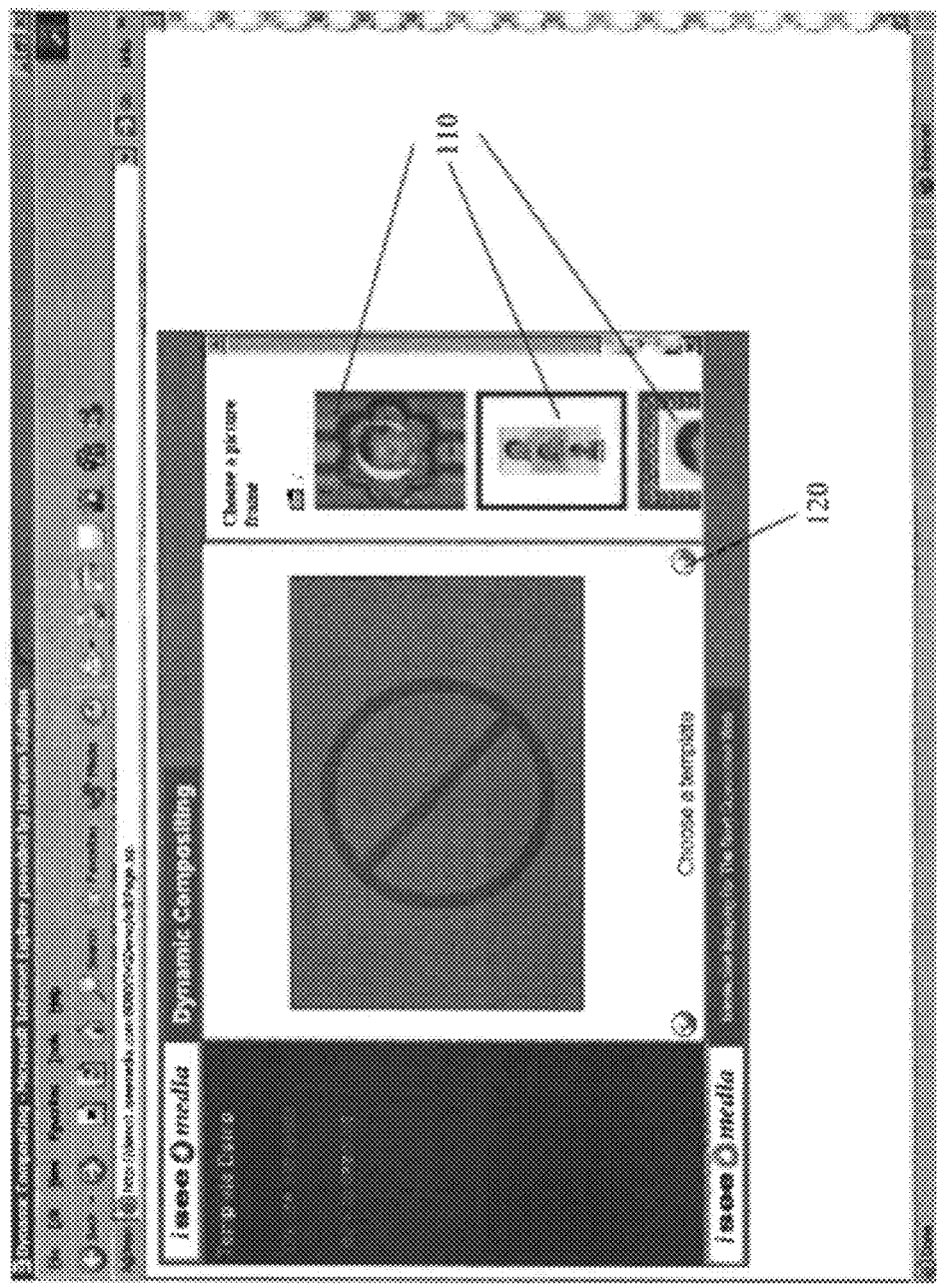
FIG. 1A illustrates a web page which enables a user to select a picture frame from among a selection of picture frame thumbnails, in accordance with a preferred embodiment of the present invention.
Figure 1B:
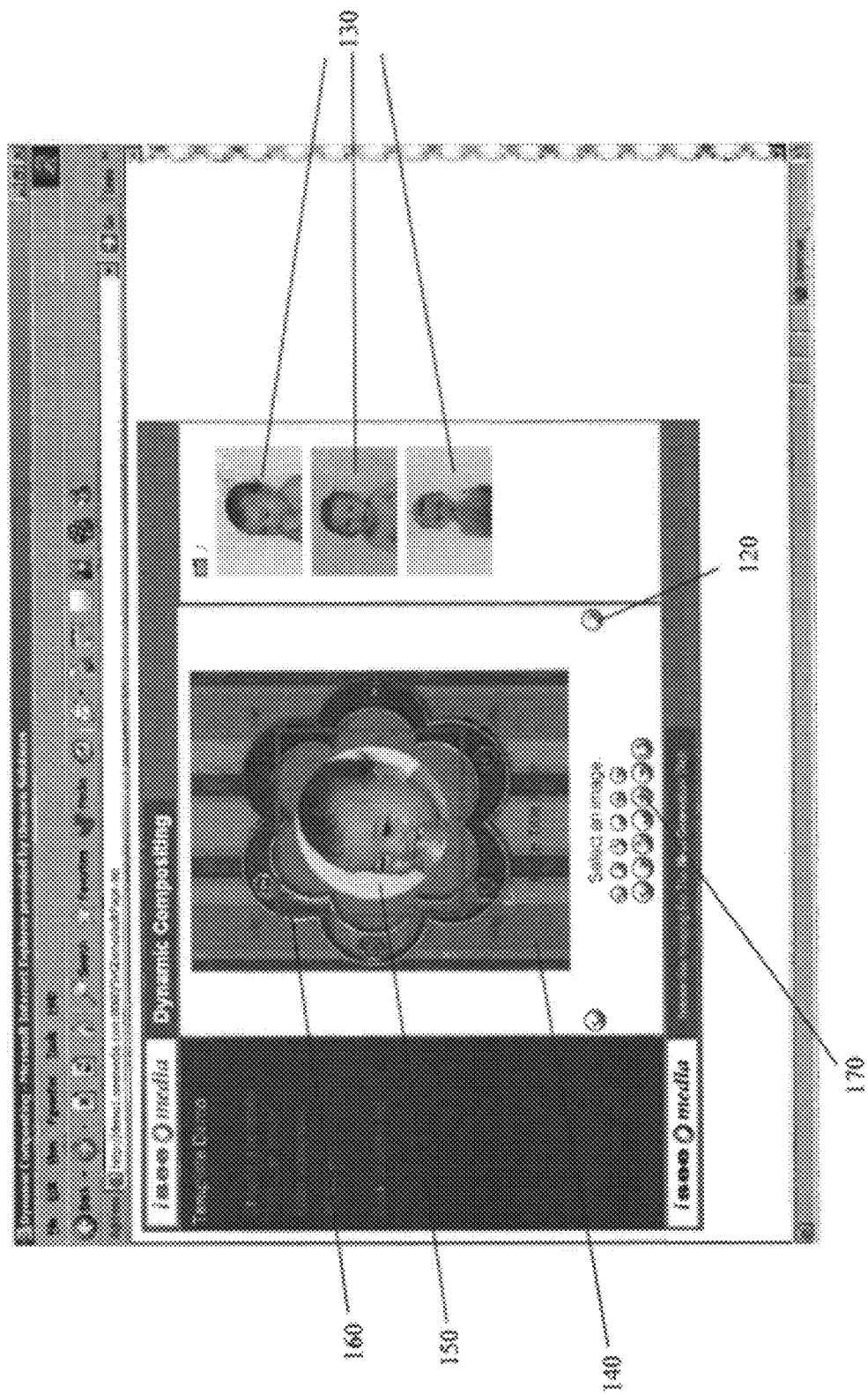
FIG. 1B illustrates a web page which enables a user to select a picture from among a selection of picture thumbnails, in accordance with a preferred embodiment of the present invention.
Figure 1C:
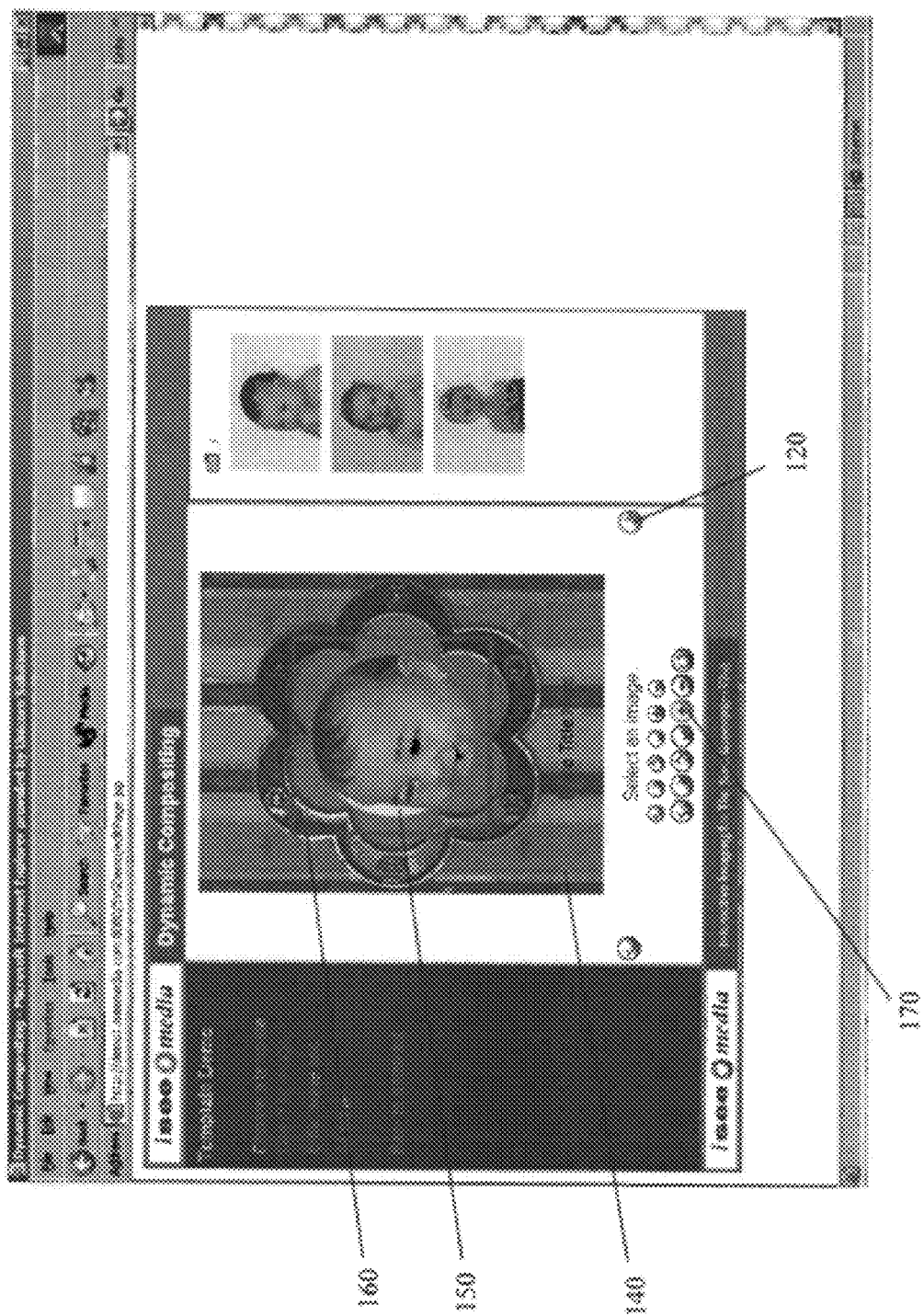
FIG. 1C illustrates a smaller portion of the selected picture within a circular cutout of the selected frame, in accordance with a preferred embodiment of the present invention.

Appendix A1 is a listing of an HTML document used to generate the page illustrated in FIG. 1A, and Appendix A2 is an SVG document used to generate the template illustrated in FIG. 1A, in accordance with a preferred sever-side embodiment of the present invention;

Appendix B is a listing of an SVG document used to generate the template illustrated in FIG. 1B, in accordance with a preferred server-side embodiment of the present invention; and Appendix C is a listing of an SVG document used to generate the template illustrated in FIG. 1C, in accordance with a preferred server-side embodiment of the present invention.

DETAILED DESCRIPTION

The present invention concerns a method and system for streaming raster images from a server computer to a plurality of client computers using SVG documents.

The present invention is preferably implemented within a network of conventional client and server computers, wherein the server computers distribute media to the client computers. The server and client computers may be conventional computing devices, each including a central processing unit, memory units for storing programs and data, input devices including a mouse and keyboard, and an output display device. Preferably, the central processing unit, memory units, and device drivers for the mouse, keyboard and display are coupled communicatively together using a conventional data bus. Preferably the server computers run web server software, and the client computers run web browser software.

It may be appreciated from the description hereinbelow, that the present invention may be implemented within mobile computing devices including inter alia personal data assistants (PDAs), mobile media players and cell phones, as long as such devices include processing means, program and data storage means, and input and display means that inter-communicate.

Reference is now made to FIGS. 1A-1F, which illustrate stages of a workflow within a graphics software application that uses image streaming through which a user generates a custom graphic by compositing a selected picture frame, a selected picture and custom text, in accordance with a preferred embodiment of the present invention. A plurality of design picture frames for a user to choose from are preferably resident on a server computer, and a plurality of photographs for a user to choose from are preferably resident on a server computer or on the user's client computer.

The workflow illustrated in FIGS. 1A-1F is architecture independent, and may be embodied in a variety of ways using image streaming, as described hereinbelow with reference to FIGS. 2-5 and Appendices B and C.

FIG. 1A illustrates a displayed web page that enables a user to select a picture frame from among a selection of picture frame thumbnails 10, in accordance with a preferred embodiment of the present invention. The user selects a specific frame by clicking on a mouse button while a mouse pointer is positioned over one of the picture frame thumbnails 110. Thereafter, the user clicks on a "Next" button 120, to proceed to the next stage, to select a picture to be placed within the selected frame.

FIG. 1B illustrates the next web page, after the user clicks on the "Next" button 120 of FIG. 1A, which enables a user to select a picture from among a selection of picture thumbnails 130, in accordance with a preferred embodiment of the present invention. The pictures corresponding to thumbnails 130 may be personal to the user, or supplied by stock image owners. The user selects a specific picture by clicking on a mouse button while a mouse pointer is positioned over one of the picture thumbnails 130.

Reference is also made to Appendix A1, which is listing of an HTML document used to generate the page illustrated in FIG. 1B, and Appendix A2, which is a listing of an SVG document used to generate the template illustrated in FIG. 1B, in accordance with a preferred server-side embodiment of the present invention. Various lines of text in the appendices are underlined for emphasis. The underlined text in Appendix A1 <EMBED SRC="Template" class="template" id="templateView" type="image/svg+xml" width="350" height="350"></EMBED> is used to embed the SVG document listed in Appendix A2, which includes the source for rendering a template that includes a selected picture frame 140 and a selected picture 150.

The underlined text in Appendix A2 xlink:href="http://demol.iseemedia.com: 80/?OBJ=IIP, 1.0& FIF=/svgDemo/smallDemo/babies/baby01.fpx& WID=171& HEI=171& RGN=0.16648138, 0.0, 0.66703725, 1.0& CVT=jpeg" is used to request a JPEG image corresponding to a portion of a Flashpix image file, baby01.fpx, for picture 150, subsampled for display at a width of 171 pixels and a height of 171 pixels. The portion requested is designated in the RGN parameter as a rectangular region with lower left coordinates (0.16648138, 0), width 0.66703725 and height 1.0, using normalized coordinates; i.e., coordinates scaled so that the entire baby picture has a width and a height of 1.0. Thus the requested portion is centered and extends the entire height of the baby picture, and from ⅙ of its width to ⅚ of its width. The entire baby picture 150 has a 3:2 aspect ratio, so the requested portion is a square pixel array. The above request is formatted according to the Internet Imaging Protocol.

Similarly, the underlined text in Appendix A2 xlink:href="http://demol.iseemedia.com: 80/?OBJ=IIP, 1.0& FIF=/svgDemo/lpimages/20001073.fpx& WID=280& CVT=jpeg" is used to request a JPEG image corresponding to an entire Flashpix image file, 200010073.fpx, for picture frame 140, subsampled for display at a width of 280 pixels and a corresponding height based on the aspect ratio of the Flashpix image.

The portion of baby picture 150 designated by the above RGN parameter is only partially visible through the cutout of frame 140. This is clear by comparing thumbnail picture 130 with the portion of baby picture 150 that shows through the cutout. In fact, a wire frame 160 surrounding the cutout corresponds to the area occupied by the entire portion of picture 150 designated by the RGN parameter. Thus, referring to the RGN parameters above, wire frame 160 encloses ⅔ of the width and all of the height of picture 150. The underlined text in Appendix A2 d="M874.665, 28.8506C1188.21, 28.8506 1442.39, 283.031 1442.39, 596.577C1442.39, 910.124 1188.21, 1164.3 874.665, 1164.3C561.118, 1164.3 306.938, 910.124 306.938, 596.577C306.938, 283.031 561.118, 28.8506 874.665, 28.8506" within the clip path having id=def3, specifies the cutout area in frame 140. Identical cutout areas are specified in Appendices B and C. The various matrices in Appendices A2, B and C are uniform scale and shift transformations.

A user viewing the page of FIG. 1B, can click on one of the buttons shown below frame 140, to adjust the portion of picture 150 that shows through the cutout. Thus, by clicking on a button 170 the user can magnify picture 150. In response, when the server receives such a user request, it modifies the SVG document accordingly, in accordance with a preferred embodiment of the present invention. Button 170 corresponds to the underlined text <IMG class="imgEditButton" src="images/in.gif" alt="in" onclick="updateTemplateImage (" IN")">, which uses the icon image in.gif to display button 170, and which invokes the function updatetemplateImage ( ) with parameter "IN", when the user clicks on button 170. As shown in Appendix A1, the thirteen adjustment buttons shown in FIG. 1B beneath frame 140 correspond to parameters "left", "right", "up", "down", "in", "out", "LEFT", "RIGHT", "UP", "DOWN", "IN", "OUT" and "reset".

FIG. 1C shows a smaller portion of picture 150 within the circular cutout of frame 140, generated after the user clicks on button 170 of FIG. 1B, in accordance with a preferred embodiment of the present invention. Reference is also made to Appendix B, which is a listing of an SVG document used to generate the template illustrated in FIG. 1C, in accordance with a preferred server-side embodiment of the present invention. Preferably, the server, upon receiving the user request corresponding to button 170, modifies the SVG document in Appendix A2, to generate the SVG document shown in Appendix B. The underlined text in Appendix B xlink:href="http://demol.iseemedia.com: 80/?OBJ=IIP, 1.0& FIF=/svgDemo/smallDemo/babies/baby01.fpx& WID=171& HEI=171& RGN=0.30098295, 0.20164026, 0.39803413, 0.5967195& CVT=jpeg" is used to request a JPEG image corresponding to a different portion of the Flashpix image file baby01.fpx, subsampled for display at the same width of 171 pixels and a height of 171 pixels. The portion requested is a rectangular region with lower left coordinates (0.30098295, 0.20164026), width 0.39803413 and height 0.5967195; i.e., centered roughly from 30% to 70% of the width, and from 20% to 80% of the height. It is noted that the rectangular region in Appendix B is smaller than the corresponding rectangle in Appendix A2, since a smaller portion of picture 150 shows through the cutout of frame 140. It is further noted that the two rectangular regions have the same ratio of width to height.

As in Appendix A2, the underlined text in Appendix B xlink:href="http://demol.iseemedia.com: 80/?OBJ=IIP, 1.0& FIF=/svgDemo/lpImages/20001073.fpx& WID=280& CVT=jpeg" is used to request the same JPEG image corresponding to the entire Flashpix image file, 20001073.fpx, for picture frame 140, subsampled for display at a width of 280 pixels and a corresponding height based on the aspect ratio of the Flashpix image.

Figure 1D:
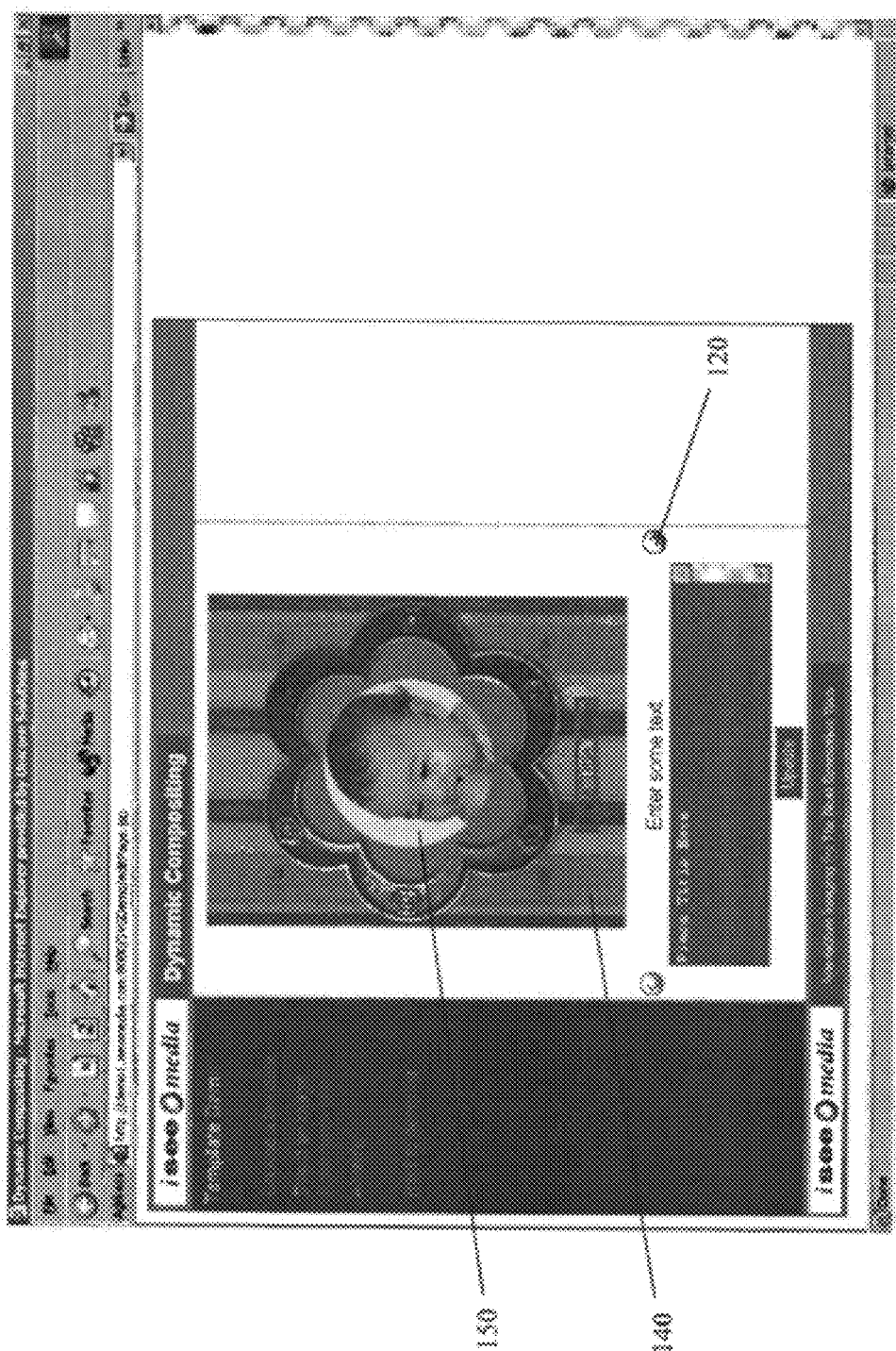
FIG. 1D illustrates a page for a next stage following FIG. 1B, when the user clicks on a "Next" button from FIG. 1B, in accordance with a preferred embodiment of the present invention.

FIG. 1D illustrates a page for a next stage following FIG. 1B, after the user clicks on "Next" button 120 from FIG. 1B, in accordance with a preferred embodiment of the present invention. The page illustrated in FIG. 1D enables the user to embed custom text within the template being composited.

Figure 1E:
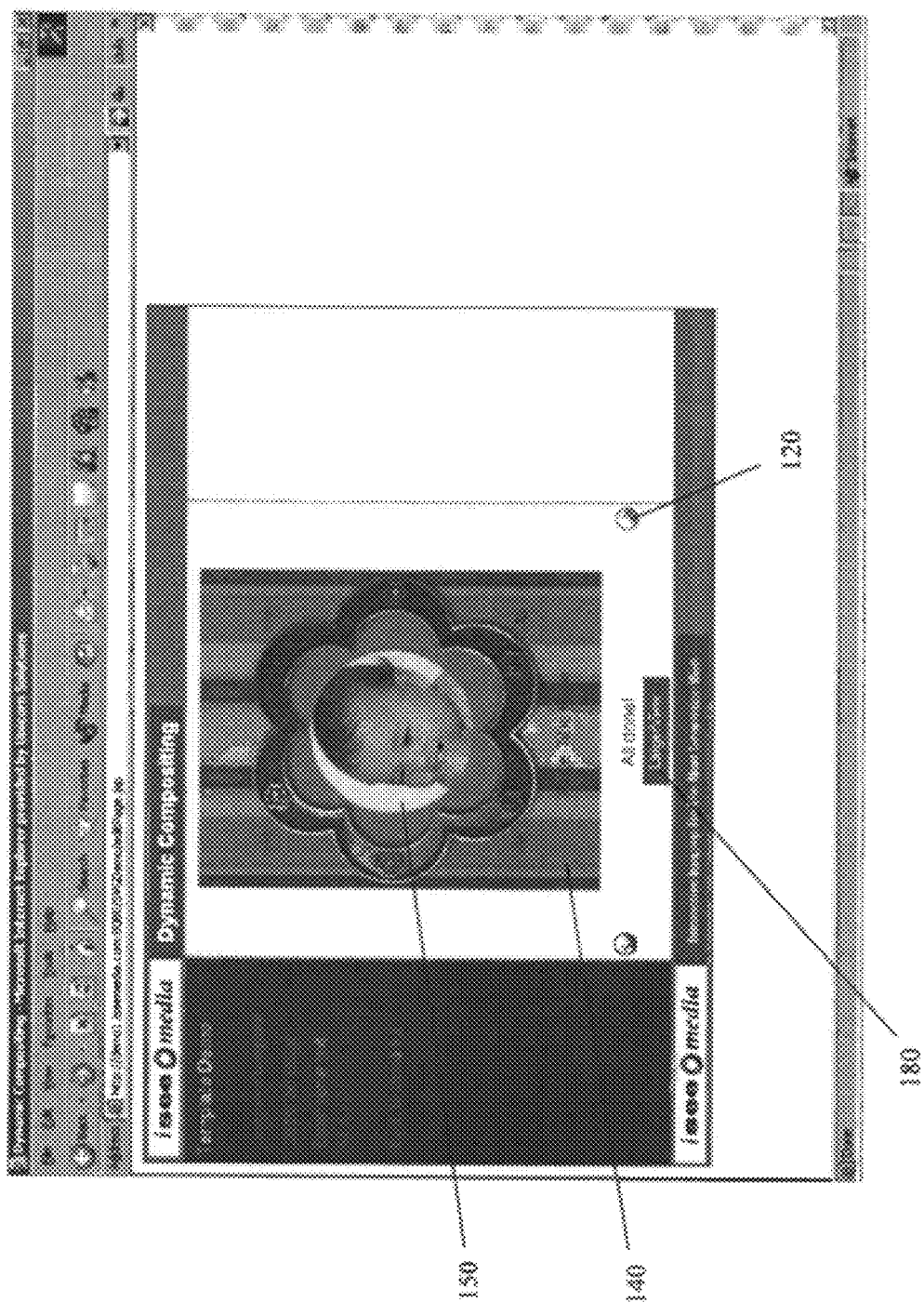
FIG. 1E illustrates a page for a next stage following FIG. 1D, when the user clicks on a "Next" button from FIG. 1D, in accordance with a preferred embodiment of the present invention.

FIG. 1E illustrates a page for a next stage following FIG. 1D, after the user clicks on "Next" button 120 from FIG. 1D, in accordance with a preferred embodiment of the present invention. At the stage illustrated FIG. 1E, the user has finished generating his graphic and composited the selected picture frame, the selected picture with the user's adjustments, and custom text. A "Larger View" button 180 enables the user to view a larger version of his composite graphic.

Figure 1F:
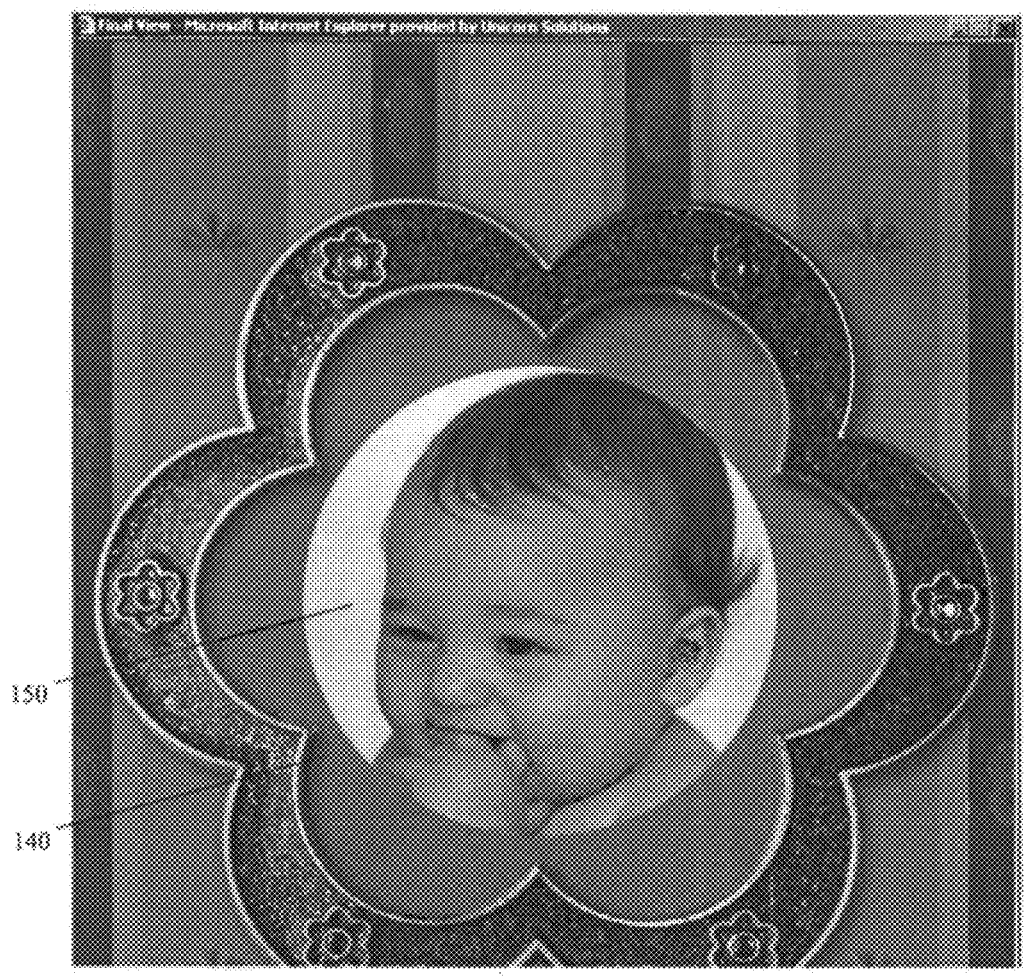
FIG. 1F illustrates an enlargement of the selected picture within the cutout of the selected frame, after the user clicks on a "Larger View" button from FIG. 1E, in accordance with a preferred embodiment of the present invention.

FIG. 1F illustrates an enlargement of picture 150 within the cutout of frame 140, after the user clicks on the "Larger View" button 180 from FIG. 1F, in accordance with a preferred embodiment of the present invention. Reference is also made to Appendix C, which is a listing of an SVG document used to generate the template illustrated in FIG. 1F, in accordance with a preferred server-side embodiment of the present invention. The underlined text in Appendix C xlink:href="http://demol.iseemedia.com: 80/?OBJ=IIP, 1.0& FIF=/svg-Demo/smallDemo/babies/baby01.fpx& WID=440& HEI=440& RGN=0.16648138, 0.0, 0.66703725, 1.0& CVT=jpeg" is used to request a JPEG image corresponding to the same portion of the Flashpix image baby01.fpx as in FIG. 1A, subsampled for display at a width of 440 pixels and a height of 440 pixels. The requested JPEG image for picture 150 is 440/171=2.57 times as large as the corresponding images for the photograph in FIGS. 1A and 1B.

The underlined text in Appendix C xlink:href="http://demol.iseemedia.com: 80/?OBJ=IIP, 1.0& FIF=/svg-Demo/lpImages/20001073.fpx& WID=720& CVT=jpeg" is used to request a JPEG image corresponding to the entire Flashpix image file, 20001073.fpx, for frame 140, subsampled for display at a width of 720 pixels and a corresponding height based on the aspect ratio of the image. As with picture 150, the requested JPEG image for frame 140 is also 720/280=2.57 times as large as the corresponding image for the frame in FIGS. 1B-1E.

It may thus be appreciated that in accordance with the server-side embodiment listed in Appendices A2, B and C, the server modifies the SVG document that it sends to the client, based on user requests it receives. Table I summarizes the rectangular regions and display pixel dimensions for FIGS. 1B, 1C and 1F.

TABLE I

RGN parameters in three versions of an SVG document

| | Rectangular Portion | Display Width | Display Height |
|---|---|---|---|
| FIG. 1B, Appendix A2 | Width: ⅙ to ⅚<br>Height: 0 to 1 | 171 | 171 |
| FIG. 1C, Appendix B | Width: 30%-70%<br>Height: 20%-80% | 171 | 171 |
| FIG. 1F, Appendix C | Width: ⅙ to ⅚<br>Height: 0 to 1 | 440 | 440 |

As mentioned hereinabove, the workflow stages illustrated in FIGS. 1A-1F can be implemented in a variety of software and hardware architectures. FIGS. 2-5 describe two such implementations; namely, a server-side implementation and a client-side implementation. The listings in Appendices A2, B and C relate to the server-side implementation described in FIGS. 2 and 3, as explained hereinbelow.

Reference is now made to FIG. 2, which is a simplified flowchart of a server-side method for implementing the workflow described in FIGS. 1A-1F, in accordance with a preferred embodiment of the present invention. FIG. 2 is divided into four columns. The left-most column indicates steps performed by an HTTP web server computer, which stores HTML and SVG documents, and transmits the documents to client computers upon request. The second column from the left indicates stages of actions performed by a user while following the workflow illustrated in FIGS. 1A-1F for preparing a composite graphic. The third column from the left indicates steps performed by the user's client computer. The right-most column indicates steps performed by an image server computer, which stores images and image tiles. It may be appreciated by those skilled in the art that the web server computer may also function as the image server computer, although this is not necessary.

At step 204, the web server sends an HTML document to the client computer, in response to an HTTP request. For example, the user may request the HTML document by entering the URL for the HTML document within his web browser. At step 208 the client computer renders the HTML document, and displays thumbnail images of picture frames for the user to select from. Such a display is illustrated in FIG. 1A.

At step 212 the user selects a specific picture frame from among the various thumbnail images, and preferably activates a button, such as "Next" button 120 in FIG. 1A, to proceed to the next workflow stage. At step 216 the web server sends a next HTML document to the client computer. At step 220 the client computer renders the HTML document, and displays thumbnail images of pictures for the user to select from. Such a display is illustrated in FIG. 1B.

At step 224 the user selects a specific picture, to be inserted into the selected picture frame, and preferably activates a button, such as "Next" button 120 in FIG. 1B, to proceed to the next workflow stage. At step 228 the web server sends a next HTML document and an SVG document to the client computer. At step 232 the client computer renders the HTML document and the SVG document, and displays the selected picture composited with the selected frame, in such a way that part of the picture shows through a cutout in the picture frame. Such a display is illustrated in FIG. 1C. The data for the picture and picture frame themselves are not included within the SVG document. Instead, only references to the picture and picture frame are included, as shown in Appendix A2. In order to render the picture and picture frame, the client computer must retrieve the required pixel data.

The embodiment shown in FIG. 2 is a server-side embodiment and, as such, the client computer has no special client software other than a standard operating system and a standard web browser. Thus in order for the client to be able to render the picture and picture frame, it must retrieve the required pixel data in the form of a conventional image file, such as a JPEG or TIF file, which the web browser can interpret.

As shown in FIG. 2, at step 236 the client requests pixel data from the image server. The image server preferably processes the request by (i) identifying the image tiles required to fulfill the request; (ii) assembling the image tiles into a single image; and (iii) re-sizing and cropping the image as appropriate. Step 236 typically involves significant image processing for the image server. The response of step 236 is a single image file in a conventional format, which is sent to the client for rendering.

At step 240 the user can adjust the size and positioning of the picture relative to the cutout in the picture frame, such as by use of buttons like those displayed in FIG. 1C. At step 244 the web server modifies the SVG document according to the user's adjustments. Preferably, the SVG document is modified by changing the reference to the picture, as described hereinabove with reference to Appendices A2 and B. At step 248 the HTML document and modified SVG document are transmitted to the client. At step 252 the client renders the HTML document and the modified SVG document, using its web browser, and displays the adjusted picture and the picture frame. Such a display is illustrated in FIG. 1D. As above, at step 236 the picture and picture frame pixel data are returned from the image server in a conventional image file format that can be interpreted by the web browser.

At step 256 the user can insert text into his graphics. At step 260 the web server preferably modifies the SVG document according to the text inserted by the user. At step 264 the web server sends the HTML document and modified SVG document to the client computer, and at step 268 the client computer renders the HTML page and SVG document, and displays the final graphic with the picture frame and with the picture as adjusted by the user at step 240, and with the text inserted by the user at step 256. Such a display is illustrated in FIG. 1E.

At step 272 the user requests a larger view of his graphics, for example, by clicking on the "Larger View" button 180 shown in FIG. 1E. At step 276 the web server again modifies the SVG document, preferably by modifying the references to the pictures and the picture frame according to the dimensions of the larger view, as described hereinabove with reference to Appendices A2 and C. At step 280 the web server sends the HTML document and modified SVG document to the client. At step 284 the client renders the larger view of the picture and picture frame and text. The pixel data for the larger picture and picture frame is retrieved from the image server at step 236 as conventional image files.

Figure 3:
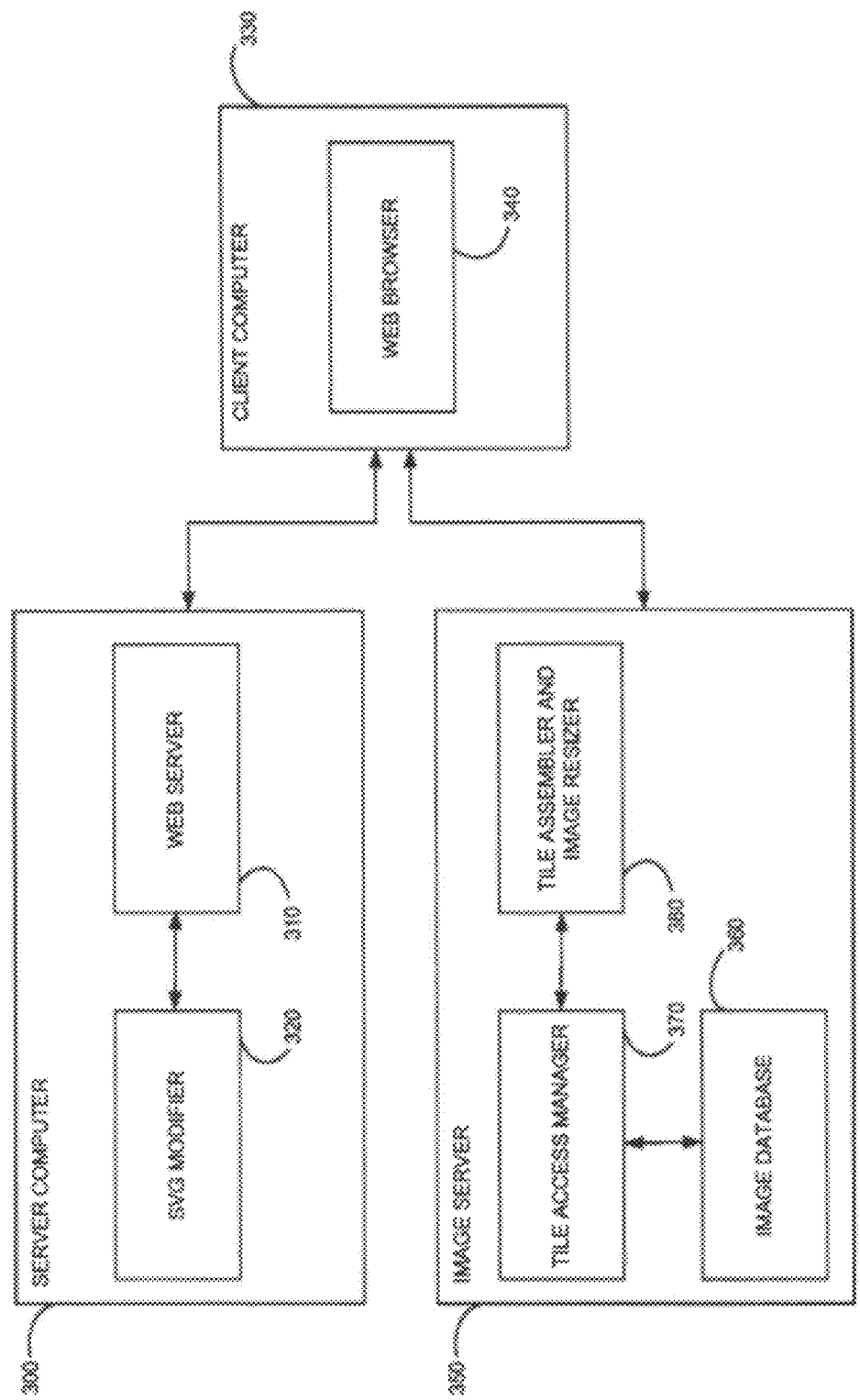
FIG. 3 is a simplified block diagram of a server-side system for implementing the workflow described in FIGS. 1A-1F, in accordance with a preferred embodiment of the present invention.

The server-side nature of the flowchart of FIG. 2 is evident through step 236 at the image server, and steps 244, 260 and 276 at the web server. Reference is now made to FIG. 3, which is a simplified block diagram of a server-side system for implementing the workflow stages described in FIGS. 1A-1F, in accordance with a preferred embodiment of the present invention. Shown in FIG. 3 is a server computer 300 that includes a conventional web server 310 and an SVG modifier 320. Preferably, SVG modifier changes references to image data within SVG documents, as indicated in Appendices A2, B and C.

A client computer 330 running a web browser 340 preferably communicates with server computer 300 using the HTTP protocol. Specifically, client computer 330 requests HTML documents and SVG documents using an HTTP GET request, and server computer 300 sends the requested documents in an HTTP POST response.

Also shown in FIG. 3 is an image server computer 350 that includes a database of images 360 that stores images and image tiles. Image server 350 also includes a tile access manager 370 for retrieving requested image tiles, and a tile assembler and image re-sizer 380 for assembling image tiles into a single image and for re-sizing and cropping the resultant image. Preferably, references to image data within the SVG documents that server computer 300 sends to client computer 330 include an address to image server 350. Thus when client computer 330 parses the SVG documents and encounters such a reference, it sends a request for image data directly to image server 350. It may be appreciated by those skilled in the art that image server 350 may be housed in the same computer as server computer 300, although this is not required.

The server-side nature of the system of FIG. 3 is evident through the presence of tile assembler and re-sizer 380 within image server 350, the presence of SVG modifier 320 within server computer 300, and the absence of a special purpose module within client computer 330.

Figure 4:
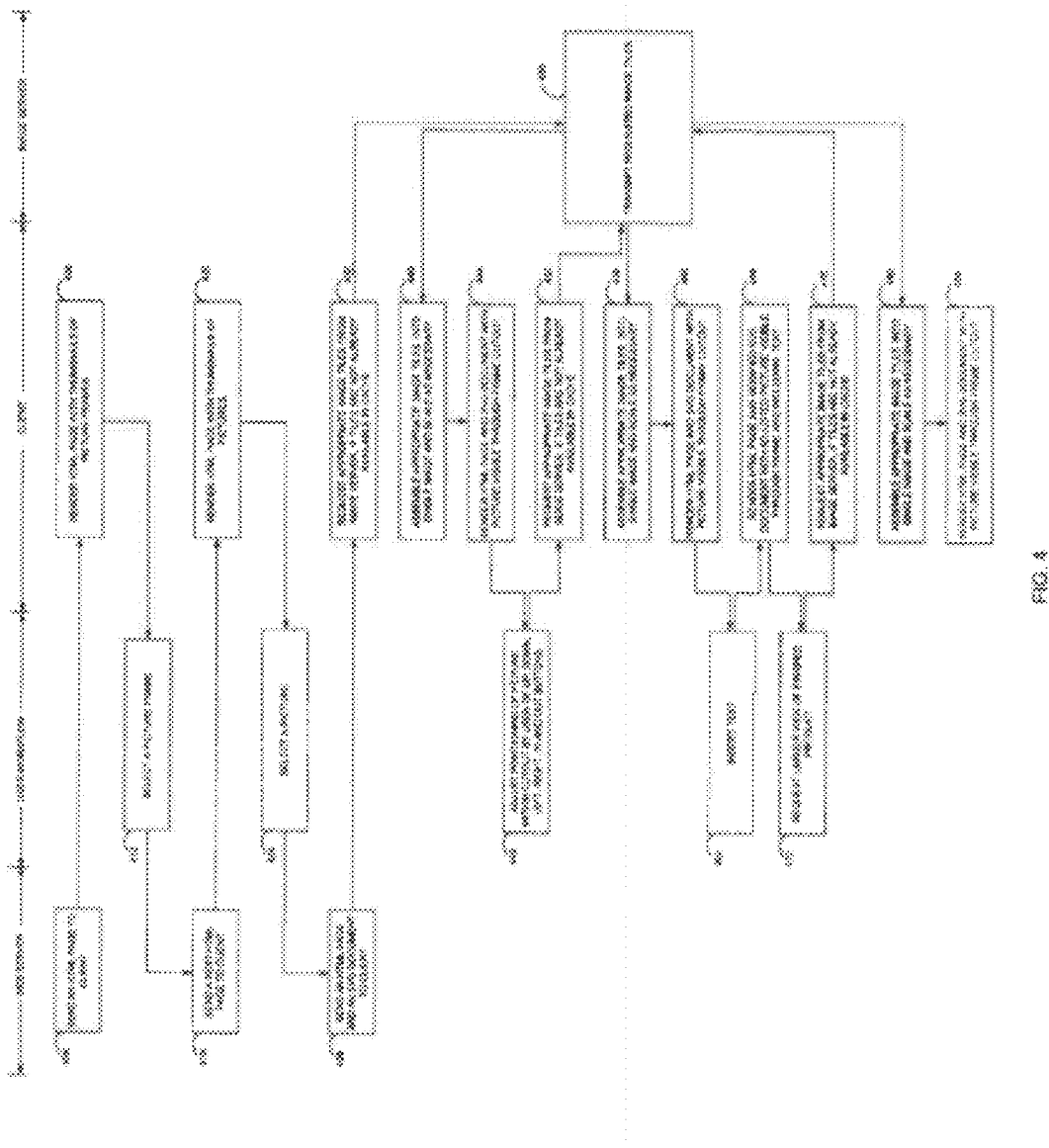
FIG. 4 is a simplified flow chart of a client-side method for implementing the workflow described in FIGS. 1A-1F, in accordance with a preferred embodiment of the present invention.

Reference is now made to FIG. 4, which is a simplified flowchart of a client-side method for implementing the workflow described in FIGS. 1A-1F, in accordance with a preferred embodiment of the present invention. As in FIG. 2, the flowchart of FIG. 4 is divided into four columns; the leftmost column indicating steps performed by a web server, the second column from the left indicating stages of actions taken by a user within a workflow for designing a composite graphic, the third column from the left indicating steps performed by the user's client computer, and the rightmost column indicating steps performed by an image server. As distinct from FIG. 2, where the client has no special software other than a standard operating system and web browser, the flowchart of FIG. 4 corresponds to a client-side implementation of the present invention. Thus in this implementation the client computer preferably includes special purpose client software for receiving image tiles, assembling the tiles into a single image, and re-sizing and cropping the image as appropriate.

At step 404 the web server sends an HTML document to the client, in response to a client request. At step 408 the client renders the HTML document, and displays thumbnails of picture frames from which the user can choose. Such a display is shown in FIG. 1A. At step 412 the user selects a specific picture frame to incorporate within his graphic.

At step 416 the web server sends a next HTML document to the client, after the user has selected a picture frame. At step 420 the client renders the HTML page, and displays thumbnails of pictures from which the user can choose. Such a display is shown in FIG. 1B. At step 424 the user selects a specific picture to incorporate within his graphic.

At step 428 the web server sends an HTML document and an SVG document to the client computer, after the user has selected his picture. At step 432 the client, in order to render the SVG document, preferably determines from the references to image data within the SVG document, which image tiles are required. The client further checks to see if some or all of the required image tiles are already available in a client cache. The client requests those required image tiles that are not available in its cache from the image server. At step 436 the image server transmits the requested image tiles to the client. Step 436 is generally much simper that the corresponding step 236 from FIG. 2, since the image server does not need to process the image tiles—only to transmit them to the client as raw unprocessed tiles.

At step 440 the client processes the required tiles by assembling them into a single image and re-sizing and cropping the assembled image as necessary. Thus, the intensive processing that was carried out by the image server in FIG. 2 at step 236 has been shifted to the client computer in FIG. 4. At step 444 the client computer renders the HTML document and SVG document, and displays the picture showing through a cutout in the picture frame. Such a display is illustrated in FIG. 1C.

At step 448 the user adjusts the size and position of the picture relative to the picture frame, by use of buttons such as those illustrated in FIG. 1C. At steps 452, 456 and 460 the client again determines the required image tiles to render the picture as adjusted by the user, checks to see which of the required image tiles are already in its cache, receives the necessary image tiles from the image server, processes the tiles to generate a single image, and renders the HTML document and SVG document to display the picture now adjusted according to the user's adjustment. Such a display is illustrated in FIG. 1D.

At step 464 the user inserts custom text into his graphic, and at step 468 the client displays the graphic with the selected picture frame and picture, as adjusted by the user, and with a layer of user's text. Such a display is illustrated in FIG. 1E.

At step 472 the user requests a larger view of his graphic, for example by clicking on Larger View" button 180 as shown in FIG. 1E. At steps 476, 480 and 484 the client again determines the required image tiles, retrieves them as necessary, and processes them to display the large view of the picture, the picture frame and the user's text. Such a display is illustrated in FIG. 1F.

The client-side nature of the flowchart of FIG. 4 is evident through steps 432, 440, 452, 456, 476 and 480 at the client, and step 436 at the image server.

Figure 5:
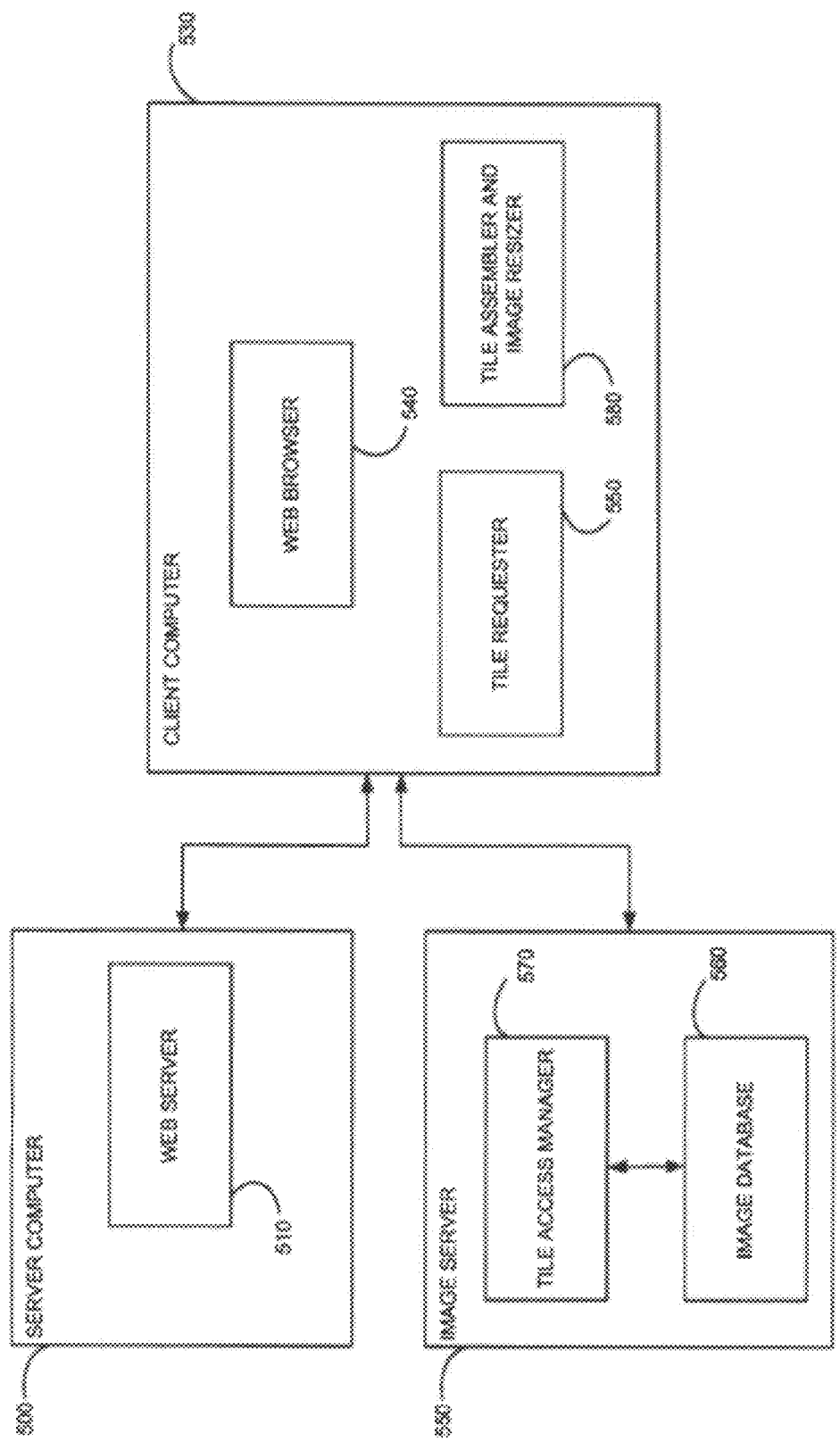
FIG. 5 is a simplified block diagram of a client-side system for implementing the workflow described in FIGS. 1A-1F, in accordance with a preferred embodiment of the present invention.

Reference is now made to FIG. 5, which is a simplified block diagram of a client-side system for implementing the workflow described in FIGS. 1A-1F, in accordance with a preferred embodiment of the present invention. Shown in FIG. 5 is a server computer 500 including a conventional web server 510. A client computer 330 communicates with server computer 300 by requesting and receiving HTML and SVG documents. Client computer 330 includes a conventional web browser 340. In additional, client computer 330 includes two special purpose modules: a tile requester 350, for requesting image tiles, and a tile assembler and image re-sizer 580, for processing image tiles to generate a desired image.

The image tiles themselves preferably reside at an image server computer 550, which includes a database of images 560 and a tile access manager 570.

The elements of FIG. 5 are numbered analogously to the elements in FIG. 3, so as to emphasize the differences between the server-side system of FIG. 3 and the client-side system of FIG. 5. Specifically, (i) server computer 500 does not require an SVG modifier; (ii) the tile assembler and re-sizer, which performs the intensive image processing work, is resident at client computer 530 and not at image server computer 550; and (iii) client computer 550 includes tile requester 550 for specifying the image tiles required by client computer to fulfill a user's request.

In reading the above description, persons skilled in the art will realize that there are many apparent variations that can be applied to the methods and systems described.

In the foregoing specification, the invention has been described with reference to specific exemplary embodiments thereof, It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX A1

```
<HTML>
    <HEAD>
        <META http-equiv="Content-Type" content="text/html; charset=UTF-8">
        <TITLE>Dynamic Compositing</TITLE>
        <!--Main style sheet-->
        <LINK media="screen" type="text/css" rel="StyleSheet" href="editStyle.css">
        <!--Start template headContent-->
        <SCRIPT language="ecmascript">
            <!--
function updateTemplateImage(editValue) {
    var srcValue = "Template?EditValue="+editValue;
    var elem = document.getElementById("templateView");
    elem.setAttribute("SRC", srcValue);
}
function openFinalView( ) {
    myWin = window.open{
        "",
        "FinalView",
"menubar=no,scrollbars=no,resizable=no,width=729,height=929");
    myWin.resizeTo(729, 929);
    myWin.location = "finalView.jsp"
}
            -->
        </SCRIPT>
        <!--End template headContent-->
    </HEAD>
    <BODY>
        <TABLE id="mainTable" cellspacing="0" cellpadding="0" align="left">
            <TBODY>
                <TR>
                    <TD colspan="2" id="header">
                        <TABLE cellspacing="0" cellpadding="0" id="logo">
                            <TR>
                                <TD><IMG alt="iseemedia logo"
```

APPENDIX A1-continued

```
src="images/ISMLogo.gif"></TD>
                                <TD class="text">Dynamic Compositing</TD>
                            </TR>
                        </TABLE>
                    </TD>
                </TR>
                <TR>
                    <TD id="sidebar">
                        <H2>Template Demo</H2>
                        <ul>
                            <li>
                                <a href="editPage.jsp?EditStep-1.x=1">Choose a template</a>
                            </li>
                            <li class="current">Select an image.</li>
                            <li>
                                <a href="editPage.jsp?EditStep1.x=1">Enter some text.</a>
                            </li>
                            <li>
                                <a href="editPage.jsp?EditStep2.x=1">All done!</a>
                            </li>
                        </ul>
                        <ul>
                            <li>
                                <a href="index.jsp">Back to demo list</a>
                            </li>
                        </ul>
                    </TD><TD id="maincontent">
                        <TABLE id="editBrowseTable" cellspacing="0" cellpadding="0">
                            <TR>
                                <TD id="editCell">
                                    <TABLE id="editTable" cellspacing="0" cellpadding="0">
                                        <TBODY>
                                            <!-- First row: template image -->
                                            <TR>
                                                <TD id="templateCell" align="center" valign="center">
                                                    <EMBED SRC="Template" class="template" id="templateView" type="image/svg+xml" width="350" height="350"></EMBED>
                                                </TD>
                                            </TR>
                                            <!-- Second row: edit step navigation -->
                                            <FORM action="editPage.jsp" method="POST" name="editForm">
                                            <TR>
                                                <TD id="editControlCell">
                                                    <!-- Navigation contained in a table with three cols-->
                                                    <TABLE id="editNavTable" cellspacing="0" cellpadding="0">
                                                        <TR>
                                                            <TD align="left" class="navCell">
                                                                <INPUT name="EditStep-1" value="-1" type="image" class="navButton" src="images/left.gif" title="Previous Step">
                                                            </TD>
                                                            <TD align="center">
                                                                Select an image.
                                                            </TD>
                                                            <TD align="right" class="navCell">
                                                                <INPUT NAME="EditStep1" value="1" type="image" class="navButton" src="images/right.gif" title="Next Step">
                                                            </TD>
                                                        </TR>
                                                    </TABLE>
                                                </TD>
                                            </TR>
                                            <!-- Third row: edit control -->
                                            <TR>
                                                <TD align="center">
                                                    <TABLE class="imgEdit">
```

APPENDIX A1-continued

```
            <TR>
                <TD class="imgEdit">
                    <IMG
class="imgEditButton" src="images/leftSm.gif" alt="left"
onclick="updateTemplateImage("left")">
                </TD>
                <TD class="imgEdit">
                    <IMG
class="imgEditButton" src="images/rightSm.gif" alt="right"
onclick="updateTemplateImage("right")">
                </TD>
                <TD class="imgEdit">
                    <IMG
class="imgEditButton" src="images/upSm.gif" alt="up"
onclick="updateTemplateImage("up")">
                </TD>
                <TD class="imgEdit">
                    <IMG
class="imgEditButton" src="images/downSm.gif" alt="down"
onclick="updateTemplateImage("down")">
                </TD>
                <TD class="imgEdit">
                    <IMG
class="imgEditButton" src="images/inSm.gif" alt="in"
onclick"updateTemplateImage("in")">
                </TD>
                <TD class="imgEdit">
                    <IMG
class="imgEditButton" src="images/outSm.gif" alt="out"
onclick="updateTemplateImage("out")">
                </TD>
                <TD class="imgEdit">
                </TD>
            </TR>
            <TR>
                <TD class="imgEdit">
                    <IMG
class="imgEditButton" src="images/left.gif" alt="left"
onclick="updateTemplateImage("LEFT")">
                </TD>
                <TD class="imgEdit">
                    <IMG
class="imgEditButton" src="images/right.gif" alt="right"
onclick="updateTemplateImage("RIGHT")">
                </TD>
                <TD class="imgEdit">
                    <IMG
```

APPENDIX A1-continued

```
class="imgEditButton" src="images/up.gif" alt="up"
onclick="updateTemplateImage("UP")">
                </TD>
                <TD class="imgEdit">
                    <IMG
class="imgEditButton" src="images/down.gif" alt="down"
onclick="updateTemplateImage("DOWN")">
                </TD>
                <TD class="imgEdit">
                    <IMG
class="imgEditButton" src="images/in.gif" alt="in"
onclick="updateTemplateImage("IN")">
                </TD>
                <TD class="imgEdit">
                    <IMG
class="imgEditButton" src="images/out.gif" alt="out"
onclick="updateTemplateImage("OUT")">
                </TD>
                <TD class="imgEdit">
                    <IMG
class="imgEditButton" src="images/reset.gif" alt="reset"
onclick="updateTemplateImage("reset")">
                </TD>
            </TR>
        </TABLE>
    </TD>
    </TR>
    </FORM>
    </TBODY>
    </TABLE>
    </TD>
    <TD id="browseCell">
        <IFRAME src="ImageDir/"></IFRAME>
    </TD>
    </TR>
</TABLE>
</TD>
</TR>
<TR>
    <TD id="footer" colspan="2"><IMG alt="iseemedia:
interactive imaging for the next generation web"
src="images/ISMLogoBanner.gif"></TD>
</TR>
</TBODY>
</TABLE>
</BODY>
</HTML>
```

APPENDIX A2

```
<!DOCTYPE svg PUBLIC "-//W3C//DTD SVG 1.0//EN"
"http://www.w3.org/TR/2001/REC-SVG-20010904/DTD/svg10.dtd">
<svg contentScriptType="text/ecmascript" width="203.2"
xmlns:xlink="http://www.w3.org/1999/xlink" zoomAndPan="magnify"
contentStyleType="text/css" viewBox="0 0 203.2 254" height="254"
preserveAspectRatio="xMidYMid meet" xmlns="http://www.w3.org/2000/svg"
version="1.0">
    <defs>
        <clipPath clipPathUnits="userSpaceOnUse" id="def0">
            <path d="M0,0L2400,0L2400,3000L0,3000L0, 0"
transform="matrix(0.0846669 0 0 0.0846669 -0.0252314 -0.126177)"/>
        </clipPath>
        <filter primitiveUnits="objectBoundingBox"
xmlns:xlink="http://www.w3.org/1999/xlink"
filterUnits="objectBoundingBox" xlink:type="simple"
xlink:actuate="onRequest" id="def1" xlink:show="replace">
            <feGaussianBlur stdDeviation="4.09"
in="SourceGraphic"/>
        </filter>
        <filter primitiveUnits="objectBoundingBox"
xmlns:xlink="http://www.w3.org/1999/xlink"
filterUnits="objectBoundingBox" xlink:type="simple"
xlink:actuate="onRequest" id="def2" xlink:show="replace">
            <feGaussianBlur stdDeviation="10.24"
```

APPENDIX A2-continued

```
in="SourceGraphic"/>
    </filter>
    <clipPath clipPathUnits="userSpaceOnUse" id="def3">
        <path d="M874.665, 28.8506C1188.21, 28.8506
1442.39,283.031 1442.39,596.577C1442.39,910.124 1188.21,1164.3
874.665,1164.3C561.118,1164.3 306.938,910.124
306.938,596.577C306.938,283.031 561.118,28.8506 874.665,28.8506"
transform="matrix(0.0904112 0 0 0.0904111 21.4494 67.88)"/>
    </clipPath>
</defs>
<rect x="0" width="203.2" y="0" height="254" style="fill:
#FFFEFF;"/>
<g clip-path="url(#def0)">
    <image transform="matrix(0.0846669 0 0 0.0846669 −0.0252314
−0.126177)" width="2400" xmlns:xlink="http://www.w3.org/1999/xlink"
xlink:href="http://demo1.iseemedia.com:80/?OBJ=IIP,1.0&FIF=/svgDemo
/lpImages/20001073.fpx&WID=280&CVT=jpeg" xlink:type="simple"
xlink:actuate="onRequest" height="3000" preserveAspectRatio="xMidYMid
slice" xlink:show="replace"/>
</g>
<g style=" fill: #FFA302;" transform="matrix(0.817078 0 0
0.848485 17.0162 34.258)" filter="url(#def1)"> <path style=" opacity:
0.3276;"
d="M30.1356,220.42L174.356,220.42L174.356,234.627L30.1356,234.627L30.13
56,220.42"/>
</g>
<g clip-path="url(#def3)">
    <image x="300" transform="matrix(0.103509 0 0 0.103509
7.27482 58.3251)" width="1200"
xmlns:xlink="http://www.w3.org/1999/xlink"
xlink:href="http://demo1.iseemedia.com:80/?OBJ=IIP,1.0&FIF=/svgDemo
/smallDemo/babies/baby01.fpx&WID=171&HEI=171&RGN=0.16648138
,0.0,0.66703725,1.0&CVT=jpeg" xlink:type="simple"
xlink:actuate="onRequest" height="1199" id="edit0"
preserveAspectRatio="xMidYMid slice" xlink:show="replace"/>
</g>
<text font-size="10.08" transform="matrix(1 0 0 1 −31.9731
98.334) translate(131.99576 135.05899)" text-anchor="middle" style="
fill: #4B0F7F;" font-family="Verdana" id="edit1" font-weight="normal">
    <tspan>
        Place Title Here
    </tspan>
</text>
<path id="__highlight__"
d="M38.32752,58.3251L38.32752,182.43239L162.53831,182.43239L162.53831,5
8.3251Z" style="fill: none; stroke-width: 1%; stroke: red; opacity:
1.0;"/>
</svg>
```

APPENDIX B

```
<!DOCTYPE svg PUBLIC "-//W3C//DTD SVG 1.0//EN"
"http://www.w3.org/TR/2001/REC-SVG-20010904/DTD/svg10.dtd">
<svg contentScriptType="text/ecmascript" width="203.2"
xmlns:xlink="http://www.w3.org/1999/xlink" zoomAndPan="magnify"
contentStyleType="text/css" viewBox="0 0 203.2 254" height="254"
preserveAspectRatio="xMidYMid meet" xmlns="http://www.w3.org/2000/svg"
version="1.0">
    <defs>
        <clipPath clipPathUnits="userSpaceOnUse" id="def0">
            <path d="M0,0L2400,0L2400,3000L0,3000L0,0"
transform="matrix(0.0846669 0 0 0.0846669 −0.0252314 −0.126177)"/>
        </clipPath>
        <filter primitiveUnits="objectBoundingBox"
xmlns:xlink="http://www.w3.org/1999/xlink"
filterUnits="objectBoundingBox" xlink:type="simple"
xlink:actuate="onRequest" id="def1" xlink:show="replace">
            <feGaussianBlur stdDeviation="4.09"
in="SourceGraphic"/>
        </filter>
        <filter primitiveUnits="objectBoundingBox"
xmlns:xlink="http://www.w3.org/1999/xlink"
filterUnits="objectBoundingBox" xlink:type="simple"
xlink:actuate="onRequest" id="def2" xlink:show="replace">
            <feGaussianBlur stdDeviation="10.24"
in="SourceGraphic"/>
        </filter>
```

APPENDIX B-continued

```
    <clipPath clipPathUnits="userSpaceOnUse" id="def3">
        <path d="M874.665,28.8506C1188.21,28.8506
1442.39,283.031 1442.39,596.577C1442.39,910.124 1188.21,1164.3
874.665,1164.3C561.118,1164.3 306.938,910.124
306.938,596.577C306.938,282.031 561.118,28.8506 874.665,28.8506"
transform="matrix(0.0904112 0 0 0.0904111 21.4494 67.88)"/>
    </clipPath>
</defs>
<rect x="0" width="203.2" y="0" height="254" style="fill:
#FFFEFF;"/>
<g clip-path="url(#def0)">
    <image transform="matrix(0.0846669 0 0 0.0846669 −0.0252314
−0.126177)" width="2400" xmlns:xlink="http://www.w3.org/1999/xlink"
xlink:href="http://demo1.iseemedia.com:80/?OBJ=IIP,1.0&FIF=/svgDemo
/lpImages/20001073.fpx&WID=280&CVT=jpeg" xlink:type="simple"
xlink:actuate="onRequest" height="3000" preserveAspectRatio="xMidYMid
slice" xlink:show="replace"/>
</g>
<g style=" fill: #FFA302;" transform="matrix(0.817078 0 0
0.848485 17.0162 34.258)" filter="url(#def1)">
    <path style=" opacity: 0.3276;"
d="M30.1356,220.42L174.356,220.42L174.356,224.627L30.1356,234.627L30.13
56,220.42"/>
</g>
<g clip-path="url(#def3)">
    <image x="300" transform="matrix(0.103509 0 0 0.103509
7.27482 58.3251)" width="1200"
xmlns:xlink="http://www.w3.org/1999/xlink"
xlink:href="http://demo1.iseemedia.com:80/?OBJ=IIP(1.0&FIF=/svgDemo
/smallDemo/babies/baby01.fpx&WID=171&HEI=171&RGN=0.30098295
,0.20164026,0.39803413,0.5967195&CVT=jpeg" xlink:type="simple"
xlink:actuate="onRequest" height="1199" id="edit0"
preserveAspectRatio="xMidYMid slice" xlink:show="replace"/>
</g>
<text font-size="10.08" transform="matrix(1 0 0 1−31.9731
98.334) translate(131.99576 135.05899)" text-anchor="middle" style="
fill: #4B0F7F;" font-family="Verdana" id="edit1" font-weight="normal">
    <tspan>
        Place Title Here
    </tspan>
</text>
<path id="__highlight__"
d="M38.32752,58.3251L38.32752,182.43239L162.53831,182.43239L162.53831,5
8.3251Z"style="fill: none; stroke-width: 1%; stroke: red; opacity:
1.0;"/>
</svg>
```

APPENDIX C

```
<!DOCTYPE svg PUBLIC "-//W3C//DTD SVG 1.0//EN"
"http://www.w3.org/TR/2001/REC-SVG-20010904/DTD/svg10.dtd" >
<svg contentScriptType="text/ecmascript" width="203.2"
xmlns:xlink="http://www.w3.org/1999/xlink" zoomAndPan="magnify"
contentStyleType="text/css" viewBox="0 0 203.2 254" height="254"
preserveAspectRatio="xMidYMid meet" xmlns="http://www.w3.org/2000/svg"
version="1.0">
    <defs>
        <clipPath clipPathUnits="userSpaceOnUse" id="def0">
            <path d="M0,0L2400,0L2400,3000L0,3000L0,0"
transform="matrix(0.0846669 0 0 0.0846669 −0.0252314 −0.126177)"/>
        </clipPath>
        <filter primitiveUnits="objectBoundingBox"
xmlns:xlink="http://www.w3.org/1999/xlink"
filterUnits="objectBoundingBox" xlink:type="simple"
xlink:actuate="onRequest" id="def1" xlink:show="replace">
            <feGaussianBlur stdDeviation="4.09"
in="SourceGraphic"/>
        </filter>
        <filter primitiveUnits="objectBoundingBox"
xmlns:xlink="http://www.w3.org/1999/xlink"
filterUnits="objectBoundingBox" xlink:type="simple"
xlink:actuate="onRequest" id="def2" xlink:show="replace">
            <feGaussianBlur stdDeviation="10.24"
in="SourceGraphic"/>
        </filter>
        <clipPath clipPathUnits="userSpaceOnUse" id="def3">
            <path d="M874.665,28.8506C1188.21,28.8506
```

APPENDIX C-continued

```
1442.39,283.031 1442.39,596.577C1442.39,910.124 1188.21,1164.3
874.665,1164.3C561.118,1164.3 306.938,910.124
306.938,596.577C306.938,283.031 561.118,28.8506 874.665,28.8506"
transform="matrix(0.0904112 0 0 0.0904111 21.4494 67.88)"/>
    </clipPath>
  </defs>
  <rect x="0" width="203.2" y="0" height="254" style="fill:
#FFFFFF;"/>
  <g clip-path="url(#def0)">
    <image transform="matrix(0.0846669 0 0 0.0846669 −0.0252314
−0.126177)" width="2400" xmlns:xlink="http://www.w3.org/1999/xlink"
xlink:href="http://demo1.iseemedia.com:80/?OBJ=IIP,1.0&FIF=/svgDemo
/lpImages/20001073.fpx&WID=720&CVT=jpeg" xlink:type="simple"
xlink:actuate="onRequest" height="3000" preserveAspectRatio="xMidYMid
slice" xlink:show="replace"/>
  </g>
  <g style" fill: #FFA302;" transform="matrix(0.817078 0 0
0.848485 17.0162 34.258)" filter="url(#def1)">
    <path style=" opacity: 0.3276;"
d="M30.1356,220.42L174.356,220.42L174.356,234.627L30.1356,234.627L30.13
56,220.42"/>
  </g>
  <g clip-path="url(#def3)">
    <image x="300" transform="matrix(0.103509 0 0 0.103509
7.27482 58.3251)" width="1200"
xmlns:xlink="http://www.w3.org/1999/xlink"
xlink:href="http://demo1.iseemedia.com:80/?OBJ=IIP,1.0&FIF=/svgDemo
/smallDemo/babies/baby01.fpx&WID=440&HEI=440&RGN=0.16648138
,0.0,0.66703725,1.0&CVT=jpeg" xlink:type="simple"
xlink:actuate="onRequest" height="1199" id="edit0"
preserveAspectRatio="xMidYMid slice" xlink:show="replace"/>
  </g>
  <text font-size="10.08" transform="matrix(1 0 0 1 −31.9731
98.334) translate(131.99576 135.05899)" text-anchor="middle" style="
fill: #4B0F7F;" font-family="Verdana" id="edit1" font-weight="normal">
    <tspan>
      Place Title Here
    </tspan>
  </text>
</svg>
```

What is claimed is:

1. A method for streaming media, comprising:
   requesting, at a client, a first portion of raster data from a server, wherein the raster data is referenced in a scalable vector graphics (SVG) document;
   receiving the first portion of raster data;
   receiving a selection;
   requesting a second portion of the raster data from the server based on the first portion and the selection;
   receiving the second portion of raster data
   receiving a selection of an overlay image; and
   displaying a composite image comprising the overlay image and at least part of the second portion of raster data;
   wherein the SVG document is packaged in a hypertext markup language (HTML) document, and wherein requesting the first portion of raster data from the server and requesting the second portion of raster data from the server each comprise a hypertext transfer protocol (HTTP) request.

2. The method of claim 1, further comprising displaying the first portion of raster data.

3. The method of claim 2, further comprising displaying the second portion of raster data.

4. The method of claim 1, wherein the selection is defined relative to the overlay image.

5. The method of claim 1, further comprising receiving the composite image comprising the overlay image and at least part of the second portion of raster data.

6. The method of claim 1, wherein the overlay image comprises at least one cutout.

7. The method of claim 1, wherein the overlay image comprises at least one of a JPEG image or a TIF image.

8. The method of claim 1, further comprising:
   requesting a modification of the SVG document; and
   receiving a modified SVG document.

9. The method of claim 8, wherein the modification comprises at least one of embedding text, rescaling the composite image, reassembling the composite image, and resizing the composite image.

10. An apparatus for streaming media, comprising:
    a computing device configured to:
    request a first portion of raster data from a server, wherein the raster data is referenced in a scalable vector graphics (SVG) document;
    receive the first portion of raster data;
    receive a selection;
    request a second portion of the raster data from the server based on the first portion and the selection;
    receive the second portion of raster data
    receive a selection of an overlay image; and
    display a composite image comprising the overlay image and at least part of the second portion of raster data
    wherein the SVG document is packaged in a hypertext markup language (HTML) document, and wherein requesting the first portion of raster data from the server and requesting the second portion of raster data from the server each comprise a hypertext transfer protocol (HTTP) request.

11. The apparatus of claim 10, wherein the computing device is further configured to display the first portion of raster data.

12. The apparatus of claim 11, wherein the computing device is further configured to display the second portion of raster data.

13. The apparatus of claim 10, wherein the selection is defined relative to the overlay image.

14. The apparatus of claim 10, wherein the computing device is further configured to receive the composite image comprising the overlay image and at least part of the second portion of raster data.

15. The apparatus of claim 10, wherein the overlay image comprises at least one cutout.

16. The apparatus of claim 10, wherein the overlay image comprises at least one of a JPEG image or a TIF image.

17. The apparatus of claim 10, wherein the computing device is further configured to:
   request a modification of the SVG document; and
   receive a modified SVG document.

18. The apparatus of claim 17, wherein the modification comprises at least one of embedding text, rescaling the composite image, reassembling the composite image, and resizing the composite image.

19. A non-transitory computer-readable storage medium having instructions stored thereon that, if executed by a computing device, cause the computing device to perform operations comprising:
   requesting a first portion of raster data from a server, wherein the raster data is referenced in a scalable vector graphics (SVG) document;
   receiving the first portion of raster data;
   receiving a selection;
   requesting a second portion of the raster data from the server based on the first portion and the selection;
   receiving the second portion of raster data
   receiving a selection of an overlay image; and
   displaying a composite image comprising the overlay image and at least part of the second portion of raster data;
   wherein the SVG document is packaged in a hypertext markup language (HTML) document, and wherein requesting the first portion of raster data from the server and requesting the second portion of raster data from the server each comprise a hypertext transfer protocol (HTTP) request.

20. The computer-readable storage medium of claim 19, wherein the operations further comprise displaying the first portion of raster data.

21. The computer-readable storage medium of claim 20, wherein the operations further comprise displaying the second portion of raster data.

22. The computer-readable storage medium of claim 19, wherein the selection is defined relative to the overlay image.

23. The computer-readable storage medium of claim 19, wherein the operations further comprise receiving the composite image comprising the overlay image and at least part of the second portion of raster data.

24. The computer-readable storage medium of claim 19, wherein the overlay image comprises at least one cutout.

25. The computer-readable storage medium of claim 19, wherein the overlay image comprises at least one of a JPEG image or a TIF image.

26. The computer-readable storage medium of claim 19, wherein the operations further comprise:
   requesting a modification of the SVG document; and
   receiving a modified SVG document.

27. The computer-readable storage medium of claim 26, wherein the modification comprises at least one of embedding text, rescaling the composite image, reassembling the composite image, and resizing the composite image.

* * * * *

UNITED STATES PATENT AND TRADEMARK OFFICE
CERTIFICATE OF CORRECTION

| | | |
|---|---|---|
| PATENT NO. | : 8,169,628 B2 | Page 1 of 2 |
| APPLICATION NO. | : 12/366499 | |
| DATED | : May 1, 2012 | |
| INVENTOR(S) | : Ziegler et al. | |

It is certified that error appears in the above-identified patent and that said Letters Patent is hereby corrected as shown below:

On the title page, item (56), under "OTHER PUBLICATIONS", in Column 2, Line 7, delete "et al," and insert -- et al., --, therefor.

In Column 2, Line 40, delete "all" and insert -- an --, therefor.

In Column 6, Line 6, delete "sever-side" and insert -- server-side --, therefor.

In Column 6, Line 57, delete "10," and insert -- 110, --, therefor.

In Column 7, Line 42, delete "200010073.fpx," and insert -- 20001073.fpx, --, therefor.

In Column 8, Line 7, delete "updatetemplateImage ( )" and insert -- updateTemplateImage ( ) --, therefor.

In Column 8, Line 63, delete "FIG. 1F," and insert -- FIG. 1E, --, therefor.

In Column 11, Lines 18-26, after "web server." delete "Reference is now...B and C." and insert the same at Line 19, as a new paragraph.

In Column 11, Line 41, delete "Thus" and insert -- Thus, --, therefor.

In Column 12, Line 26, delete "simper that" and insert -- simpler than --, therefor.

In Column 13, Line 29, delete "thereof," and insert -- thereof. --, therefor.

In Column 17, Line 12, delete "#FFFEFF;"/>" and insert -- #FFFFFF;"/> --, therefor.

In Column 17, Line 33, delete "&CVT" and insert -- &CVT --, therefor.

Signed and Sealed this
Ninth Day of October, 2012

David J. Kappos
*Director of the United States Patent and Trademark Office*

CERTIFICATE OF CORRECTION (continued)
U.S. Pat. No. 8,169,628 B2

In Column 19, Line 10, delete "#FFFEFF;"/>" and insert -- #FFFFFF;"/> --, therefor.

In Column 19, Line 29, delete "=IIP(1.0" and insert -- =IIP, 1.0 --, therefor.

In Column 21, Line 46, in Claim 1, delete "data" and insert -- data; --, therefor.

In Column 22, Line 55, in Claim 10, delete "data" and insert -- data; --, therefor.

In Column 22, Line 58, in Claim 10, delete "data" and insert -- data; --, therefor.

In Column 23, Line 34, in Claim 19, delete "data" and insert -- data; --, therefor.